(12) United States Patent
Jang et al.

(10) Patent No.: US 12,494,549 B2
(45) Date of Patent: Dec. 9, 2025

(54) BATTERY MODULE AND BATTERY PACK COMPRISING SAME

(71) Applicant: LG Energy Solution, Ltd., Seoul (KR)

(72) Inventors: Sung Hwan Jang, Daejeon (KR); Jun Yeob Seong, Daejeon (KR); Hyoung Suk Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/560,606

(22) PCT Filed: Nov. 8, 2022

(86) PCT No.: PCT/KR2022/017450
§ 371 (c)(1),
(2) Date: Nov. 13, 2023

(87) PCT Pub. No.: WO2023/085729
PCT Pub. Date: May 19, 2023

(65) Prior Publication Data
US 2024/0258652 A1    Aug. 1, 2024

(30) Foreign Application Priority Data
Nov. 12, 2021 (KR) .................. 10-2021-0155941

(51) Int. Cl.
*H01M 50/502* (2021.01)
*H01M 50/211* (2021.01)
(Continued)

(52) U.S. Cl.
CPC ....... *H01M 50/502* (2021.01); *H01M 50/211* (2021.01); *H01M 50/367* (2021.01); *H01M 50/54* (2021.01)

(58) Field of Classification Search
CPC ............ H01M 50/502; H01M 50/211; H01M 50/367; H01M 50/54; H01M 50/394;
(Continued)

(56) References Cited

U.S. PATENT DOCUMENTS 7,547,487 B1   6/2009   Smith et al.
2012/0129024 A1   5/2012   Marchio et al.
(Continued)

FOREIGN PATENT DOCUMENTS

CN   211743231   * 10/2020 .............. H01M 2/10
CN   112582756 A   3/2021
(Continued)

OTHER PUBLICATIONS

Machine English translation CN 211743231 (Year: 2020).*
International Search Report for PCT/KR2022/017450 mailed Mar. 6, 2023. 3 pages.

*Primary Examiner* — Michael L Dignan
(74) *Attorney, Agent, or Firm* — Lerner David LLP (57) ABSTRACT

A battery module includes a battery cell assembly in which two or more longitudinal unit cells, each of which has electrode leads at both ends in the longitudinal direction arranged in a row in the longitudinal direction, are stacked in two or more columns in the thickness direction of the battery cell; a terminal bus bar coupled to the battery cell; a venting plate installed between the columns of the longitudinal unit cells and having a gas venting channel therein; and a module case configured to accommodate the battery cell assembly and the venting plate. The electrode leads of the adjacent battery cells except for the battery cells coupled to the terminal bus bar are directly connected to each other, and a venting hole communicating with the gas venting channel is provided in the module case.

18 Claims, 8 Drawing Sheets

(51) Int. Cl.
*H01M 50/367* (2021.01)
*H01M 50/54* (2021.01)

(58) Field of Classification Search
CPC ............ H01M 50/507; H01M 50/516; H01M 50/548; H01M 50/30; H01M 50/358; Y02E 60/10
See application file for complete search history.

(56) References Cited

U.S. PATENT DOCUMENTS

| | | | |
|---|---|---|---|
| 2013/0034755 A1 | 2/2013 | Kim | |
| 2017/0331089 A1* | 11/2017 | Hashimoto | ......... H01M 50/291 |
| 2018/0048033 A1 | 2/2018 | Lee et al. | |
| 2018/0108892 A1 | 4/2018 | Kim et al. | |
| 2019/0097192 A1 | 3/2019 | Kim et al. | |
| 2019/0181405 A1 | 6/2019 | Kim et al. | |
| 2020/0144580 A1 | 5/2020 | Hong et al. | |
| 2020/0174029 A1 | 6/2020 | Sears et al. | |
| 2021/0273302 A1 | 9/2021 | Jin et al. | |
| 2022/0263189 A1* | 8/2022 | Ko | ...................... H01M 50/264 |
| 2023/0041540 A1 | 2/2023 | Sun et al. | |
| 2023/0079498 A1* | 3/2023 | Jeon | ................... H01M 10/613 429/57 |

FOREIGN PATENT DOCUMENTS

| | | |
|---|---|---|
| CN | 214123964 U | 9/2021 |
| JP | 2008053019 A | 3/2008 |
| KR | 20130015115 A | 2/2013 |
| KR | 20140144948 A | 12/2014 |
| KR | 20150062777 A | 6/2015 |
| KR | 20160149836 A | 12/2016 |
| KR | 20180092065 A | 8/2018 |
| KR | 20190069873 A | 6/2019 |
| KR | 102009443 B1 | 8/2019 |
| KR | 102030726 B1 | 10/2019 |
| KR | 102033101 B1 | 10/2019 |
| KR | 20200029307 A | 3/2020 |
| KR | 20200043976 A | 4/2020 |
| KR | 102259416 B1 | 6/2021 |
| KR | 102266389 B1 | 6/2021 |
| WO | 2021212795 A1 | 10/2021 |

* cited by examiner

[FIG. 1]

Prior Art

BATTERY MODULE AND BATTERY PACK COMPRISING SAME

CROSS-REFERENCE TO RELATED APPLICATIONS

The present application is a national phase entry under 35 U.S.C § 371 of International Application No. PCT/KR2022/017450 filed on Nov. 8, 2022 which claims the benefit of priority based on Korean Patent Application No. 10-2021-0155941, filed on Nov. 12, 2021, all contents of which are incorporated herein by reference.

TECHNICAL FIELD

An aspect of the present invention relates to a battery module.

More particularly, an aspect of the present invention relates to a battery module configured to be expandable, in which an electrical connection structure of a battery cell assembly included in the battery module is simplified and gas in the module can be discharged.

In addition, an aspect of the present invention relates to a battery pack including the battery module.

BACKGROUND ART

Recently, secondary batteries that can be charged and discharged have been widely used as energy sources of wireless mobile devices. In addition, the secondary battery has attracted attention as an energy source of an electric vehicle, a hybrid electric vehicle, and the like, which are proposed as a solution for air pollution and the like of existing gasoline vehicles and diesel vehicles using fossil fuel. Accordingly, the types of applications using the secondary battery are diversifying due to the advantages of the secondary battery, and it is expected that the secondary battery will be applied to many fields and products in the future.

In addition, as an energy storage system (ESS), a power source for an electric vehicle (EV), or the like, there is an increasing demand for a battery module accommodating a plurality of secondary batteries electrically connected in series or in parallel and a battery pack composed of the battery modules.

Such a battery module or battery pack includes an external housing made of a metal material to protect a plurality of secondary batteries from external impacts or receive and store them.

Figure 1:
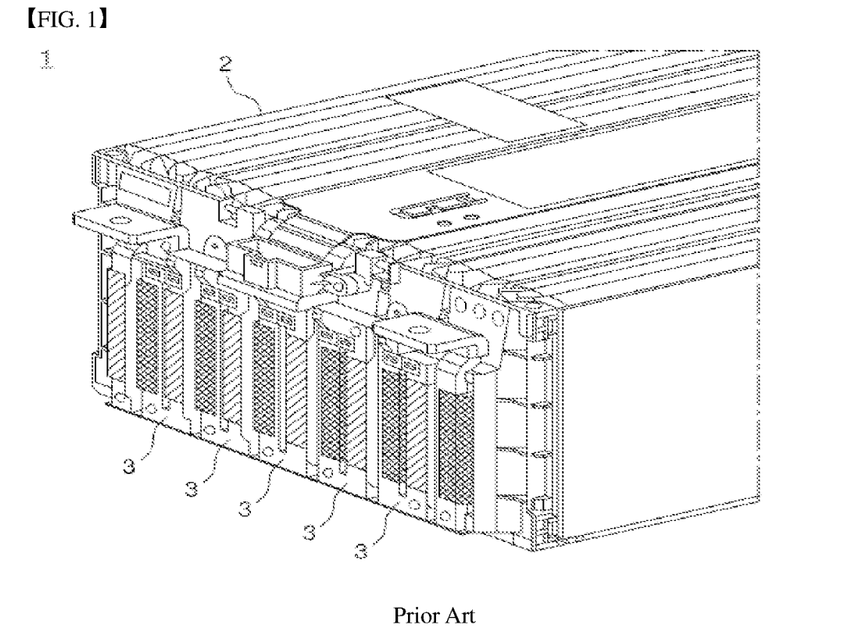
FIG. 1 is a partial perspective view of a conventional general battery module.

FIG. 1 is a partial perspective view of a conventional general battery module 1. As shown in the drawing, in the battery module 1, a battery cell assembly in which several tens of battery cells are stacked is accommodated in one module case 2. In addition, a plurality of inter-bus bars 3 are installed on a front end of the module in order to electrically connect the battery cells of the battery cell assembly.

The conventional battery module has the following problems.

First, since a single battery cell is stacked only in a thickness direction thereof, space utilization of battery cell arrangement may be reduced and a degree of freedom in design may be reduced, and thus there is a limitation in configuring a battery pack by combining these types of modules. That is, it is not easy to configure the battery module or the battery pack so as to correspond to a limited space such as a vehicle or various types of spaces. In addition, since about several tens of battery cells are stacked in one module, when ignition occurs in one battery cell, there is a risk that flame easily propagates to other battery cells and the module burns out in a short time.

Second, due to a structure in which a bus bar frame is installed at a front end of the module case 2 and the inter-bus bar 3 connected to each of the battery cells is installed in the bus bar frame, in order to provide a space in which the bus bars are installed, the shape of the bus bar frame has to be complicatedly molded. In addition, the required number of the inter-bus bars 3 also increases according to the number of the battery cells, thereby causing a cost increase.

Third, since a path to safely discharge gas to the outside does not exist in a module unit, when an internal venting phenomenon occurs, an internal temperature of the module rises, resulting in a high risk of fire and explosion.

Accordingly, there is a need to develop a battery module-related technology capable of increasing a degree of freedom in design of a battery module and a battery pack, simplifying a coupling structure of a battery cell, and efficiently discharging gas inside the module so that flame propagation is prevented.

DISCLOSURE

Technical Problem

Aspects of the present invention have been devised to solve the above problem, and an aspect of the present invention is directed to providing an expandable battery module capable of improving space utilization of a battery module and a battery pack by connecting battery cells in a longitudinal direction in addition to a thickness direction of the battery cell.

An aspect of the present invention is also directed to providing a battery module having a structure capable of reducing an assembly process and manufacturing costs by simply connecting battery cells without an inter-bus bar when the battery cell is electrically connected.

An aspect of the present invention is also directed to providing a battery module having a gas venting structure capable of efficiently discharging gas generated inside the above expandable battery module.

Technical Solution

A battery module according to an aspect of the present invention for solving the above problems includes a battery cell assembly in which two or more longitudinal unit cells, each of which two or more battery cells having electrode leads at both ends in the longitudinal direction are arranged in a row in the longitudinal direction, are stacked in two or more columns in the thickness direction of the battery cell, a terminal bus bar coupled to the battery cell included in the battery cell assembly, a venting plate installed between the columns of the longitudinal unit cells and having a gas venting channel therein, and a module case configured to accommodate the battery cell assembly and the venting plate, wherein, among the battery cells of the battery cell assembly, the electrode leads of the adjacent battery cells except for the battery cell coupled to the terminal bus bar are directly connected to each other, and a venting hole communicating with the gas venting channel is provided in the module case.

As one example, the terminal bus bar may be coupled to the electrode lead of the battery cell located at a front end or a rear end of the battery cell assembly in the longitudinal direction.

Specifically, the electrode leads of the battery cells of the longitudinal unit cell, which face each other in the longitudinal direction, may be welded and connected, and the electrode leads of the battery cells of adjacent columns, to which the terminal bus bar is not coupled and which are included in the longitudinal unit cells at the front end or the rear end of the battery cell assembly in the longitudinal direction, may be bent in the thickness direction of the battery cell and coupled to each other by welding.

As a specific example, the module case may include a front end plate and a rear end plate configured to cover the front end and the rear end of the battery cell assembly, respectively, and the terminal bus bar may be coupled to the front end plate or the rear end plate.

As another example, the terminal bus bars may be coupled to the electrode leads of the battery cells of the longitudinal unit cell, which face in the longitudinal direction.

Specifically, the electrode leads of the battery cells, which face each other in the longitudinal direction, of the longitudinal unit cells of columns, which are not coupled to the terminal bus bar, may be welded and connected. The electrode leads of the battery cells included in the longitudinal unit cells of adjacent columns at the front end and rear end in the longitudinal direction may be bent in the thickness direction of the battery cell and coupled to each other by welding.

As one example, the same number of columns of the longitudinal unit cells may be disposed on each of both sides of the venting plate with respect to the longitudinal direction of the battery cell, and the venting plate may be installed to extend in the longitudinal direction of the battery cell across a front end and a rear end of the module case.

As a specific example, the gas venting channel may include a longitudinal channel extending in the longitudinal direction of the venting plate, and a transverse channel communicating with the longitudinal channel and opened to the outside of the venting plate, and the transverse channel may be provided at a position corresponding to a middle point between the electrode leads of the both ends of the battery cell included in the longitudinal unit cell.

In addition, the venting plate may include a venting through-hole communicating with the longitudinal channel at a position corresponding to a gas pocket portion connected to the electrode lead of the battery cell included in the longitudinal unit cell.

As one example, the venting plate may include a body portion extending in the longitudinal direction of the battery cell, and a heat propagation prevention plate installed perpendicular to the body portion at a position corresponding between the electrode leads of the battery cells of the longitudinal unit cell, which face each other in the longitudinal direction.

Specifically, a lead coupling through-hole in which the electrode leads of the battery cells pass and are supported may be provided at each of the heat propagation prevention plate and a front end and a rear end of the body portion of the venting plate.

A battery pack according to another aspect of the present invention includes a battery module stack formed by stacking the battery module in plural in at least one of a longitudinal direction and a thickness direction of the battery cell.

Advantageous Effects

According to an aspect of the present invention, it is possible to obtain an expandable battery module capable of improving space utilization of a battery module and a battery pack by connecting battery cells in a longitudinal direction in addition to a thickness direction.

In addition, an aspect of the present invention can realize an electrical connection structure of a simple battery cell suitable for the expandable battery module.

In addition, an aspect of the present invention can improve the safety of the battery module by realizing a gas venting structure capable of efficiently discharging gas generated inside the expandable battery module.

DESCRIPTION OF REFERENCE NUMERALS

10: battery cell
11 and 12: electrode leads
100: battery cell assembly
110: longitudinal unit cell
200 and 200': terminal bus bars (first embodiment)
210 and 210': terminal bus bars (second embodiment)
220 and 220': terminal bus bar support blocks
300: venting plate
310: body portion
311: gas venting channel
311$a$: longitudinal channel
311$b$: transverse channel
W: partition wall O: channel outlet
E: channel inlet
312: venting through-hole
313: lead coupling through-hole
320: heat propagation prevention plate
321: lead coupling through-hole
400: module case
410: C-shaped wall
411: venting hole
420: I-shaped wall
430 and 430': front end plates
440 and 440': rear end plates
1000 and 1000': battery modules
1100: battery module stack
2000: battery pack
2100: battery pack case

DETAILED DESCRIPTION

Hereinafter, embodiments of the present invention will be described in detail. Prior to this, terms or words used in the present specification and claims should not be restrictively interpreted as ordinary meanings or dictionary-based meanings, but should be interpreted as meanings and concepts consistent with the technical ideas of the present invention on the basis of the principle that an inventor can properly define the concept of a term to describe and explain his or her invention in the best way.

Throughout this specification, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Further, when a portion such as a layer, a film, an area, a plate, or the like is referred to as being "on" another portion, this includes not only the case in which the portion is "directly on" the another portion but also the case in which still another portion is interposed therebetween. In contrast, when a portion such as a layer, a film, an area, a plate, or the like is referred to as being "below" another portion, this includes not only the case in which the portion is "directly below" the another portion but also the case in which still another portion is interposed therebetween. In addition, to be disposed "on" in the specification of the present invention may include the case disposed at the lower portion as well as the upper portion.

A battery module according to an embodiment of the present invention includes a battery cell assembly in which two or more longitudinal unit cells, each of which two or more battery cells having electrode leads at both ends in the longitudinal direction are arranged in a row in the longitudinal direction, are stacked in two or more columns in the thickness direction of the battery cell, a terminal bus bar coupled to the battery cell included in the battery cell assembly, a venting plate installed between columns of the longitudinal unit cells and having a gas venting channel therein, and a module case configured to accommodate the battery cell assembly and the venting plate, wherein, among the battery cells of the battery cell assembly, the electrode leads of the adjacent battery cells except for the battery cell coupled to the terminal bus bar are directly connected to each other, and a venting hole communicating with the gas venting channel is provided in the module case.

The present invention may be divided into the following embodiments according to an installation position of the terminal bus bar included in the battery module.

First Embodiment

Figure 2:
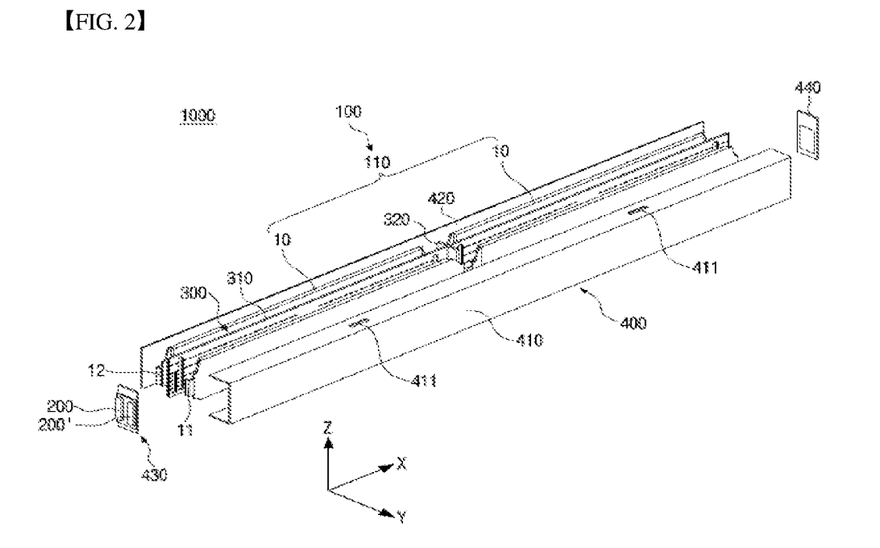
FIG. 2 is an exploded perspective view of a battery module according to one embodiment of the present invention.
Figure 3:
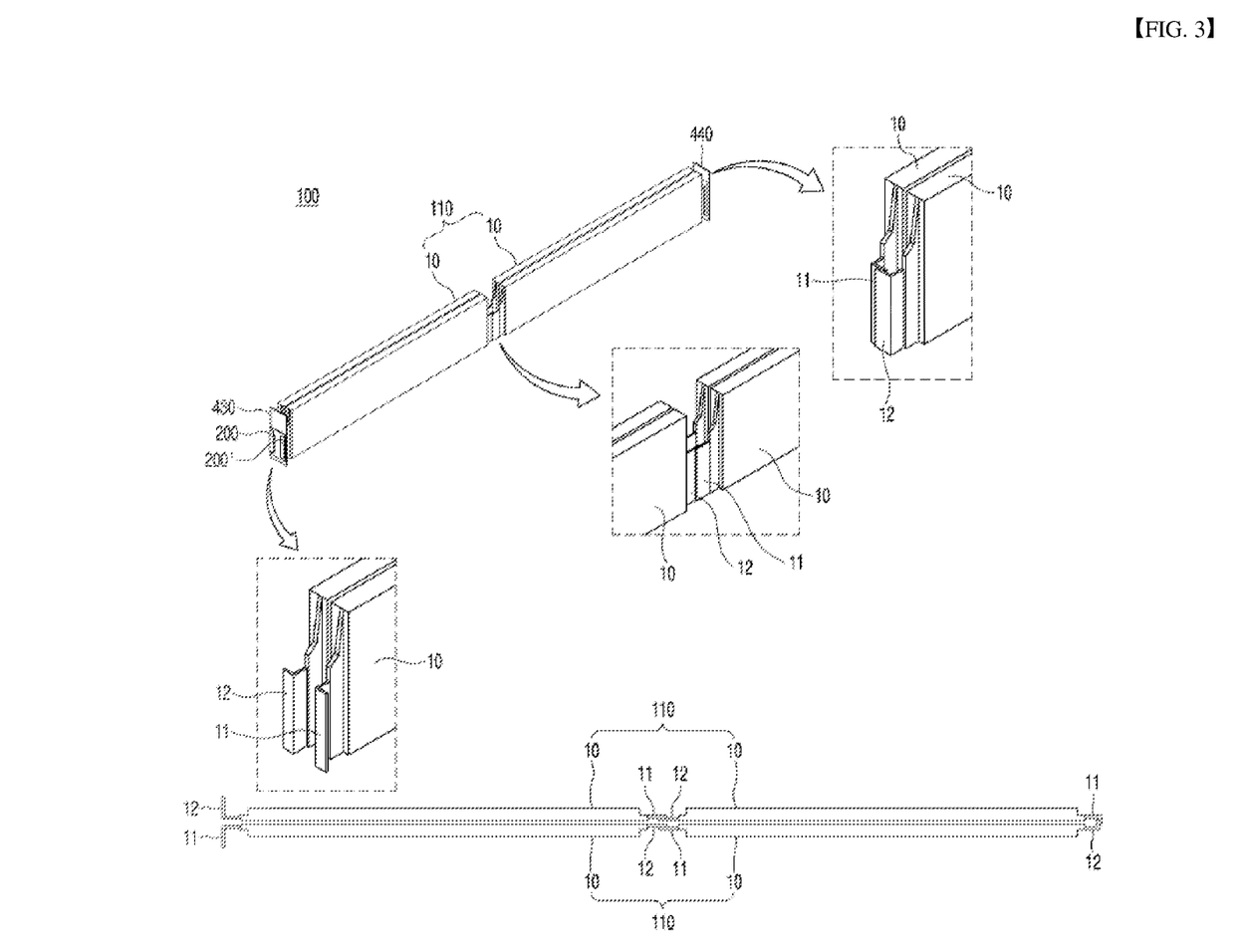
FIG. 3 is a set of a perspective view and a plan view illustrating a coupling relationship of a battery cell assembly which is a component of the battery module of FIG. 2.
Figure 4:
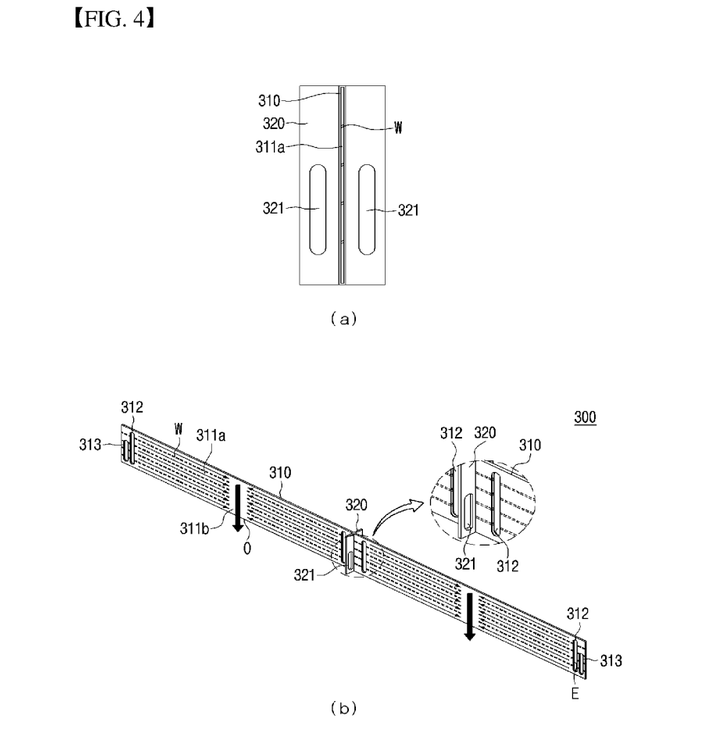
FIG. 4 is a set of a perspective view and a front view illustrating a structure of a venting plate included in the battery module of FIG. 2.

FIG. 2 is an exploded perspective view of a battery module according to one embodiment of the present invention, FIG. 3 is a set of a perspective view and a plan view illustrating a coupling relationship of a battery cell assembly which is a component of the battery module of FIG. 2, and FIG. 4 is a set of a perspective view and a front view illustrating a structure of a venting plate included in the battery module of FIG. 2.

As shown in FIG. 2, an embodiment of the present invention includes a battery cell assembly 100 including a longitudinal unit cell 110, and a module case 400 configured to accommodate the battery cell assembly 100. In FIG. 2, based on a typical pouch-shaped battery cell 10 having electrode leads 11 and 12 at both ends thereof and extending long in a longitudinal direction, an X direction is the longitudinal direction of the battery cell 10 or the battery module (case), a Y direction (a stacking direction of the battery cells) is a thickness direction of the battery cell 10 or the module case 400, and a Z direction is an up and down direction.

The battery cell 10 of an embodiment of the present invention is directed to a battery cell (a so-called bidirectional battery cell (bidirectional pouch cell)) in which electrode leads 11 and 12 are provided at both ends in the longitudinal direction. According to this configuration, in one battery cell 10, since a positive electrode lead 11 and a negative electrode lead 12 are provided to protrude from both ends, respectively, interference does not exist between the electrode leads, and thus, an area of the electrode lead can be increased, and a coupling operation of the electrode lead and a bus bar can be performed more easily.

The battery cell assembly 100 of an embodiment of the present invention includes a battery cell bundle, in which two or more of these bidirectional battery cells 10 are arranged in a line in the longitudinal direction and the electrode leads 11 and 12 of the battery cells 10, which face each other in the longitudinal direction, are electrically connected to each other, as the longitudinal unit cell 110. Although two battery cells 10 are connected in the longitudinal direction to form the longitudinal unit cell 110 in FIGS. 2 and 3, two or more battery cells may be connected in the longitudinal direction. The number of the battery cells 10 connected in the longitudinal direction is not limited in principle as long as a space of the battery pack, in which the battery module case 400 or a battery module 1000 is installed, is allowed. However, approximately two to four battery cells 10 may be connected in the longitudinal direction since a space of the battery module 1000 or battery pack that can be actually installed in a vehicle is limited. In addition, the number of the battery cells 10 connected in the longitudinal direction may be changed according to the size (length) of the battery cell 10 to be connected. As described above, in the present specification, an assembly of the battery cells 10 configured by arranging two or more battery cells 10, each of which has the electrode leads 11 and 12 provided at both ends in the longitudinal direction, in a line to face each other are referred to as the longitudinal unit cell 110.

The battery cell assembly 100 included in the battery module 1000 of an embodiment of the present invention is configured by stacking the longitudinal unit cells 110 in two or more columns in the thickness direction (Y direction) of the battery cell 10. The number of columns in which the longitudinal unit cells 110 are stacked also depends on the allowable space of the battery module 1000 and the battery pack, the size of the battery cell 10, and the like. In addition, the number of the battery cells 10 in the longitudinal direction, the number of columns, and the like may be determined in consideration of the required capacity of an electric device. As described above, according to embodiments of the present invention, the number of the battery cell assemblies 100, which are accommodated in the module case 400, in the longitudinal direction of the battery cell and the number of columns may be adjusted, and thus a degree of freedom in design is improved. In addition, when about two to four battery cell assemblies 100 are stacked in the longitudinal direction and the resultant stack is stacked in about two to six columns in the thickness direction of the battery cell instead of stacking several tens of the battery cell assemblies 100 as in the related art, the battery cell assembly 100 can be configured in a compact manner. In addition, when the battery cell assembly 100 composed of a small number of the battery cells 10 is accommodated in a separate module case 400, and the battery module 1000 including the module case 400 is stacked in the longitudinal direction or the thickness direction of the battery cell 10 like Lego® blocks, the battery pack may be freely configured in consideration of a space in which the battery module 1000 is installed or an installation space of the battery pack. For example, when the battery module 1000 is stacked in the longitudinal direction, even when the battery cells of the longitudinal unit cell 110 are not connected longer in the longitudinal direction, the same effect can be achieved. Accordingly, an individual battery module (unit module) can be configured to be more compact in size. In addition, the degree of freedom in design may be improved by stacking the battery module 1000 in the thickness direction of the battery cell as many as the required number. With the structure in which several tens of battery cells are stacked in one module case 2 as shown in FIG. 1, it is difficult to configure the battery pack as desired. That is, since the minimum units of the battery cells included in the battery module constituting the battery pack are different, the degree of freedom in design of the conventional battery module 1 is inevitably reduced.

In addition, for example, when ignition occurs in some battery cells included in the battery module, in the battery module 1 of FIG. 1, flame easily propagates to the adjacent battery cells. However, in the structure of the battery module 1000 of FIG. 2 or a battery pack 2000 disclosed in FIG. 13, which will be described below, since the battery cell assembly 100 having a small number of the battery cells 10 is separately accommodated in the battery module 1000, even when ignition occurs in the battery cells 10 in one battery module 1000, the ignition is difficult to propagate to other battery modules 1000.

As described above, the battery cell assembly 100 of an embodiment of the present invention has the form in which the battery cell assembly 100 composed of a specific number of the battery cells 10 connected in the longitudinal direction and the thickness direction of the battery cell is accommodated in each module case 400. Accordingly, various types of battery packs may be manufactured according to a stacking (design) method of the battery module 1000 including the battery cell assembly 100, and thus the battery module 1000 of embodiments of the present invention can be referred to as an expandable module.

The battery cell assembly 100 of an embodiment of the present invention shown in FIGS. 2 and 3 has a so-called 1P4S connection structure and is composed of a total of four battery cells 10 by connecting two battery cells 10 in the longitudinal direction and stacking the longitudinal unit cells 110 in two columns.

However, a battery cell assembly configured by stacking the two longitudinal unit cells in even-numbered columns, such as four columns (2P4S), six columns (3P4S), or eight columns (4P4S), may also be possible by varying the number of columns of the two longitudinal unit cells connected in the longitudinal direction. In addition, instead of the structure of connecting two longitudinal unit cells in the longitudinal direction, a structure of connecting three longitudinal unit cells (1P6S, 2P6S, 3P6S, . . . , or the like), and a structure connecting four longitudinal unit cells (1P8S, 2P8S, 3P8S, . . . , or the like), or a structure of connecting more longitudinal unit cells is also possible. For example, it is an advantage of embodiments of the present invention that a stack structure of each of the longitudinal unit cell and the battery cell assembly can be changed in various and scalable ways according to a design request of the above-described battery module and the battery pack.

Although not shown in the drawing, an insulating plate, an insulating sheet, or the like may be installed between the columns of the longitudinal unit cells 110. In one embodiment of the present invention, a venting plate 300 is installed between the columns of the longitudinal unit cells 110 instead of the insulating plate.

The battery module 1000 of an embodiment of the present invention includes terminal bus bars 200 and 200' coupled to the battery cells 10 included in the battery cell assembly 100. The terminal bus bars 200 and 200' are terminals that may be connected to another adjacent battery module 1000 or an external device. In the present embodiment, the terminal bus bars 200 and 200' are coupled to the electrode leads 11 and 12 of the battery cells 10 located at a front end or a rear end of the battery cell assembly 100 in the longitudinal direction.

Referring to FIG. 2, in the present embodiment, the terminal bus bars 200 and 200' are coupled to a front end plate 430 covering the front end of the battery cell assembly 100. Optionally, the terminal bus bars 200 and 200' may also be installed on the rear end side of the battery cell assembly 100, and in this case, the terminal bus bars 200 and 200' may be coupled to a rear end plate 440 covering the rear end of the battery cell assembly 100. In FIG. 2, two terminal bus bars 200 and 200' of the front end plate 430 are provided according to polarities, and coupled to the electrode leads 11 and 12 of the battery cells 10, which are located at a front end of the longitudinal unit cell 110, at a rear surface side of the front end plate 430.

A characteristic point of embodiments of the present invention is that, among the battery cells 10 of the battery cell assembly 100, the electrode leads of the adjacent battery cells, except for the battery cells coupled to the terminal bus bars 200 and 200', are directly connected to each other. That is, an electrical connection structure of the battery cells is greatly simplified by directly connecting the electrode leads without an inter-bus bar used when connecting electrode leads of conventional battery cells. The electrode leads 11 and 12 may be connected by welding, such as laser welding, spot welding, or the like.

FIG. 3 is a view schematically illustrating an electrical connection relationship of the battery cells 10 of the battery cell assembly 100 of the present embodiment, by omitting the illustration of the venting plate 300 to be described below for convenience of illustration.

As shown in the perspective view and the plan view of FIG. 3, the electrode leads 11 and 12 of the battery cells 10, which face each other in the longitudinal unit cell 110, are directly welded and coupled. In addition, in the battery cell assembly 100, the electrode leads 11 and 12 of the battery cells, which are included in the longitudinal unit cells 110 of adjacent columns, to which the terminal bus bars 200 and 200' are not coupled, at a front end or a rear end of the longitudinal unit cell 110 in the longitudinal direction, may be bent in the thickness direction of the battery cell, and coupled to each other by welding. In FIG. 3, the terminal bus bars 200 and 200' are coupled to the front ends of the longitudinal unit cells 110, and thus it is illustrated that the electrode leads 11 and 12 of the adjacent battery cells at the rear end of the longitudinal unit cell 110 are bent toward and coupled to each other. When the electrode leads 11 and 12 of the battery cells coupled to the terminal bus bars 200 and 200' are electrically connected to each other, a short-circuit may occur, and thus the electrode leads of the adjacent longitudinal unit cells 110 are respectively coupled to two terminal bus bars 200 and 200' provided on the front end plate 430. Two terminal bus bars 200 and 200' are provided depending on polarities.

In addition, the battery module 1000 of an embodiment of the present invention includes the venting plate 300 disposed between the columns of the longitudinal unit cells 110 and having a gas venting channel therein.

In FIGS. 2 and 4, and in particular, in section (b) of FIG. 4, one embodiment of the venting plate 300 is illustrated.

The venting plate 300 may be disposed between the columns of the longitudinal unit cells 110 and may prevent the propagation of heat and flame in the thickness direction of the battery cell when the flame is generated due to overheating or the like inside the battery cell. The same number of longitudinal unit cells 110 may be disposed on each of both sides of the venting plate 300 with respect to the longitudinal direction of the battery cell 10. In the present embodiment, one longitudinal unit cell 110 is disposed on each of left and right sides with respect to the venting plate 300. The venting plate 300 may have a size larger than that of the battery cell 10 so as to cover all area of the battery cell as possible. That is, the venting plate 300 may have a width sufficient to cover the entire width of the battery cell. The length of the venting plate 300 may extend in the longitudinal direction of the battery cell across a front end and a rear end of the module case 400 so that the venting plate 300 can cover all the longitudinal unit cells 110.

In particular, the venting plate 300 has a hollow structure in which a gas venting channel 311 capable of discharging gas and flame is provided.

The gas inside the battery module 1000 is mostly generated near the electrode lead of the battery cell 10, and based on the pouch cell, near a gas pocket portion which is a terrace portion between the electrode leads and a body portion of the battery cell. Accordingly, the venting channel 311 may include a gas inlet E (a venting through-hole 312 or an opening communicating therewith) communicating with the inside of the battery module 1000 at a position of the venting plate 300 corresponding to the gas pocket portion. Referring to section (b) of FIG. 4, a total of four venting through-holes 312 are provided in the venting plate 300 at positions corresponding to the gas pocket portions of the battery cells included in the battery cell assembly 100, and the venting through-hole 312 and the gas venting channel 311 communicate with each other.

In addition, the gas venting channel 311 includes an outlet O capable of discharging the gas and the flame. Since the gas and the flame introduced through the gas inlet E corresponding to the gas pocket portion have a high temperature, the outlet O of the venting channel needs to be spaced far away from the gas inlet E so that the temperature of the gas or the like is lowered and the gas or the like is discharged to the outside. To this end, the gas venting channel 311 of an embodiment of the present invention includes a flow path extending from the gas inlet E to the outlet O.

Specifically, the gas venting channel 311 may include a longitudinal channel 311a extending in the longitudinal direction of the venting plate 300 and a transverse channel 311b communicating with the longitudinal channel 311a and opened to the outside of the venting plate 300. At this point, the transverse channel 311b may be located at a position corresponding to a middle point between the electrode leads of both ends of the battery cell included in the longitudinal unit cell 110 when the battery cell assembly is coupled to the venting plate 300. Accordingly, as shown in section (b) of FIG. 4, gas from the gas pocket portion near the electrode leads 11 and 12 at the end portions of the battery cells moves to a position corresponding to the middle point through the longitudinal channel 311a, and the gas and the flame can be easily discharged from the position through the transverse channel 311b.

The gas venting channel, particularly the longitudinal channel 311a, may be provided in plural along the longitudinal direction of the venting plate 300. The front view is shown in section (a) of FIG. 4, the longitudinal channel 311a of the venting plate 300 is divided by a partition wall W to form five longitudinal channels 311a. The gas passing through the plurality of longitudinal channels 311a merges in the transverse channel 311b and can be discharged to the outside toward at least one of upward and downward with respect to a width direction of the venting plate 300.

Meanwhile, the venting plate 300 of the present embodiment includes a body portion 310 extending in the longitudinal direction of the battery cell, and further includes a heat propagation prevention plate 320 installed perpendicular to the body portion 310. The heat propagation prevention plate 320 is installed at a position corresponding between the electrode leads 11 and 12 of the battery cells 10 of the longitudinal unit cell 110, which face each other in the longitudinal direction. Accordingly, heat propagation between the battery cells 10 of the longitudinal unit cell 110 arranged in the longitudinal direction can be blocked by the heat propagation prevention plate 320.

As shown in FIG. 3, the electrode leads 11 and 12 of the adjacent battery cells, which are not coupled to the terminal bus bars, among the battery cells of the battery cell assembly 100 are directly connected to each other. The venting plate 300 includes separate through-holes to which the electrode leads are coupled or which support the portions at which the electrode leads are coupled. In the present embodiment, since two columns of longitudinal unit cells 110 are provided around the venting plate 300, lead coupling through-holes 321 are provided in left and right sides of the heat propagation prevention plate 320 so that the electrode leads 11 and 12 of the battery cells, which face each other in the longitudinal direction, pass therethrough and are coupled by welding. In addition, in order to provide a space at which the electrode leads 11 and 12 of the battery cells 10 at the front end or the rear end of the longitudinal unit cell 110 are bent and coupled by welding, a lead coupling through-hole 313 through which the electrode leads of the battery cells can pass is provided at each of a front end and a rear end of the venting plate 300. The size of the lead coupling through-hole 313 may be variously changed according to the purpose of use, such as a size that facilitates coupling between the electrode leads or a size enough to support the coupled electrode leads.

In addition, embodiments of the present invention include the module case 400 in which the battery cell assembly 100 and the venting plate 300 are accommodated.

That is, as shown in FIG. 2, an embodiment of the present invention includes the module case 400 that surrounds and accommodates the battery cell assembly 100. The module case 400 has a rectangular parallelepiped structure extending long in the longitudinal direction to accommodate the battery cell assembly unique to an embodiment of the present invention. In FIG. 2, the module case 400 is formed by coupling a C-shaped wall 410 and an I-shaped wall 420, but the embodiments of present invention are not limited thereto. For example, a form in which two C-shaped walls disposed left and right or up and down are combined is possible, and a form in which upper, lower, left, and right cases are separated and coupled through welding, hooking coupling, a fastening member, or the like is also possible.

In addition, the module case 400 of embodiments of the present invention includes the front end plate 430 and the rear end plate 440. The front end plate 430 and the rear end plate 440 are coupled to coupling bodies of the C-shaped wall 410 and the I-shaped wall 420 to close front and rear sides of the module, respectively. As described above, the terminal bus bars 200 and 200' are coupled to the front end plate 430 or the rear end plate 440, and the electrode leads 11 and 12 of the battery cells located at the front end or the rear end of the longitudinal unit cell 110 may be connected to the terminal bus bars 200 and 200'.

The module case 400 includes a venting hole 411 at a position communicating with the gas venting channel 311 of the venting plate 300. For example, the venting hole 411 may be provided in an upper surface or a lower surface of the module case 400 at a position connected to the outlet O of the transverse channel 311b, which is a portion of the gas venting channel 311 in the venting plate 300 of section (b) of FIG. 4. Since gas and flame in the battery module can be rapidly discharged through the gas venting channel 311 and the venting hole 411 of the module case 400, the safety of the expandable battery module can be improved.

Figure 5:
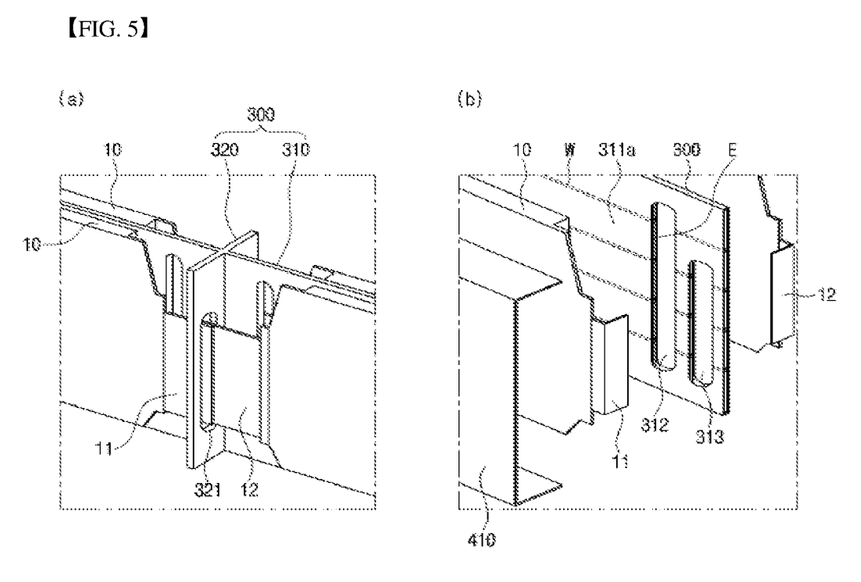
FIG. 5 is a perspective view illustrating a specific coupling relationship of the battery cell assembly of the battery module of the embodiment of FIG. 2.
Figure 6:
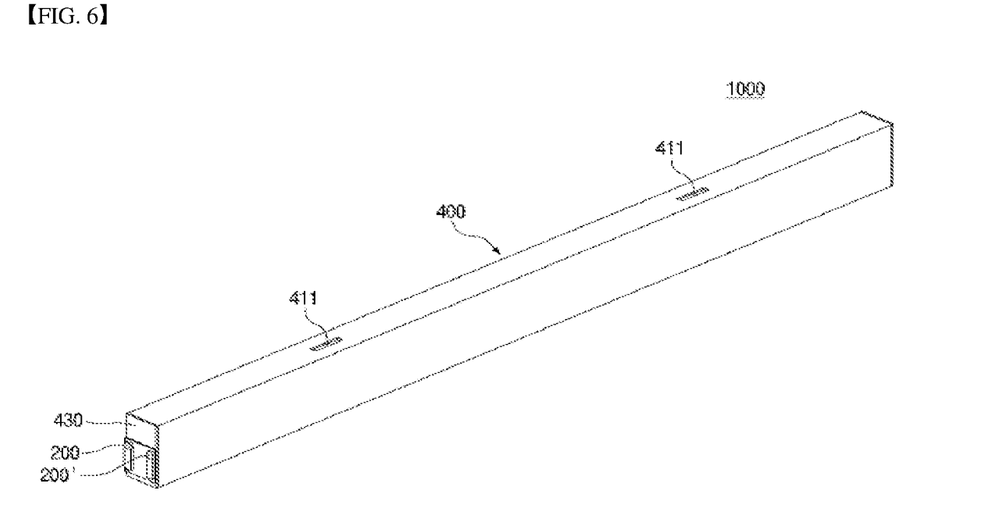
FIG. 6 is a perspective view illustrating an assembled exterior of the battery module of FIG. 2.

FIG. 5 is a perspective view illustrating a specific coupling relationship of the battery cell assembly of the battery module of the embodiment of FIG. 2, and FIG. 6 is a perspective view illustrating an assembled exterior of the battery module of FIG. 2.

Specifically, FIG. 5 is a perspective view specifically illustrating an electrical connection structure of the battery cell assembly 100 related to the venting plate 300 in a state in which the module case 400 is not assembled.

Section (a) of FIG. 5 illustrates coupling between the electrode leads of the battery cells 10, which face each other in the longitudinal direction and correspond to an intermediate portion of the longitudinal unit cell 110, and well illustrates that the electrode leads 11 and 12 of the battery cells at both sides are coupled by welding through the lead coupling through-hole 321 provided in the heat propagation prevention plate 320 of the venting plate 300.

Section (b) of FIG. 5 illustrates coupling between the electrode leads of the battery cells located at end portions of the longitudinal unit cells 110 of adjacent columns, and illustrates that the electrode leads of the battery cells are coupled by welding through the lead coupling through-hole 313 located at the front end of the venting plate 300. In particular, FIG. 5B illustrates the venting through-hole 312 (long hole) behind the lead coupling through-hole 313 in the venting plate 300, and illustrates that the venting through-hole 312 and the gas venting channel, specifically the longitudinal channel 311a, communicate with each other through the gas inlet E.

FIG. 6 illustrates a state in which the battery cell assembly 100 and the venting plate 300 are accommodated and assembled in the module case 400, and illustrates that the front end plate 430 to which the terminal bus bars 200 and 200' are attached is coupled to the front end of the module case 400. As shown in the drawing, the venting hole 411, which communicates with the gas venting channel 311 of the venting plate 300 in the module, is located at a predetermined position in the upper surface of the module case 400.

Second Embodiment

Figure 7:
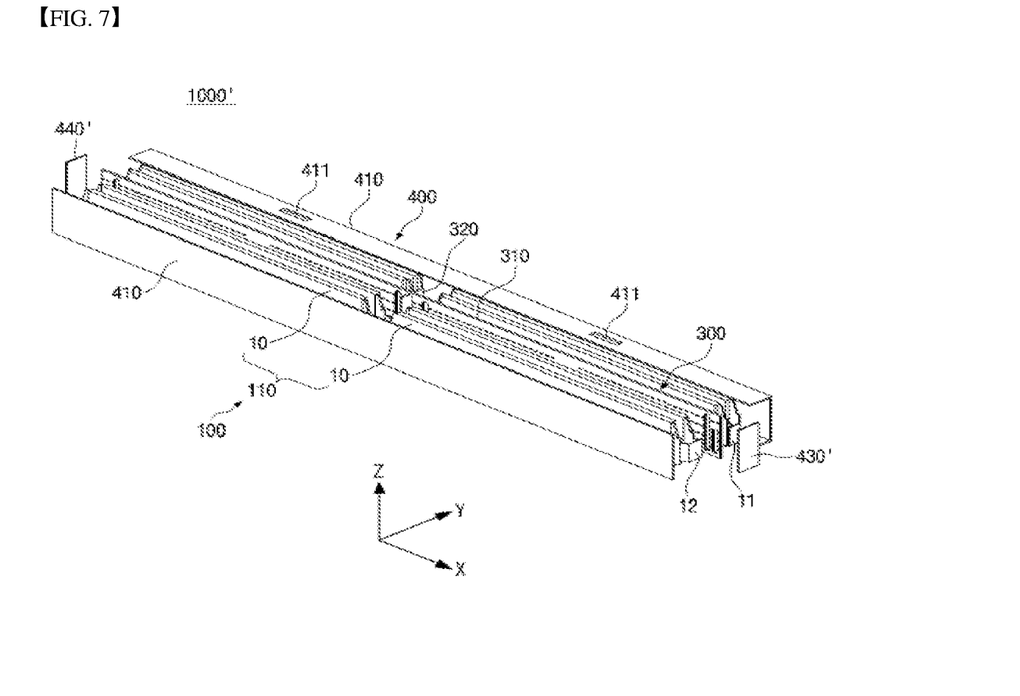
FIG. 7 is an exploded perspective view of a battery module according to another embodiment of the present invention.
Figure 8:
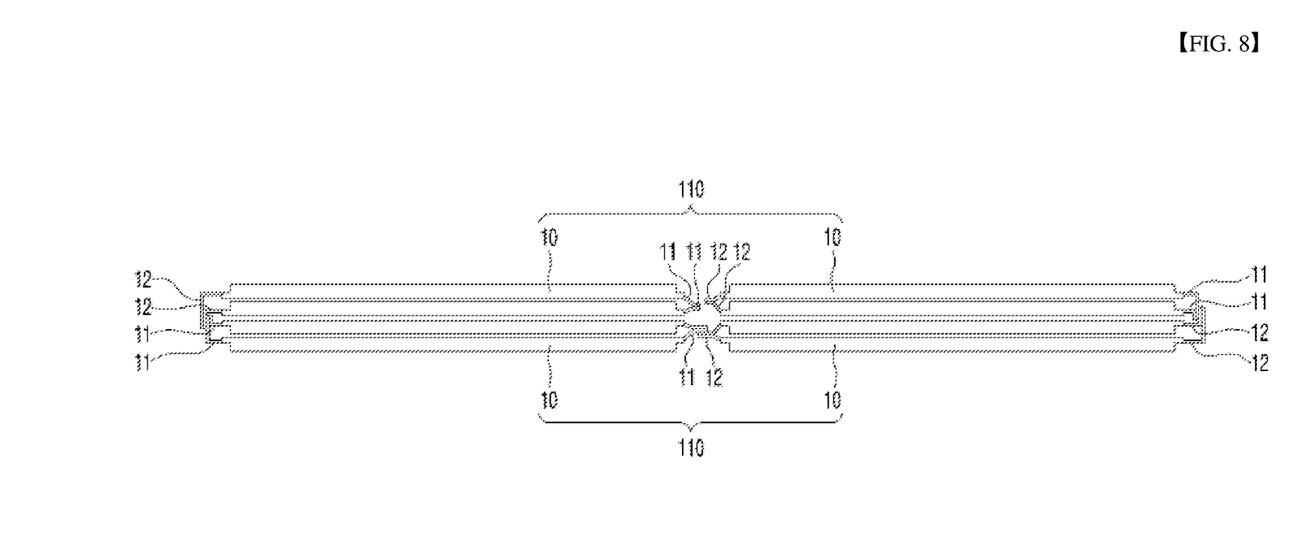
FIG. 8 is a plan view illustrating a coupling relationship of a battery cell assembly that is a component of the battery module of FIG. 7.
Figure 9:
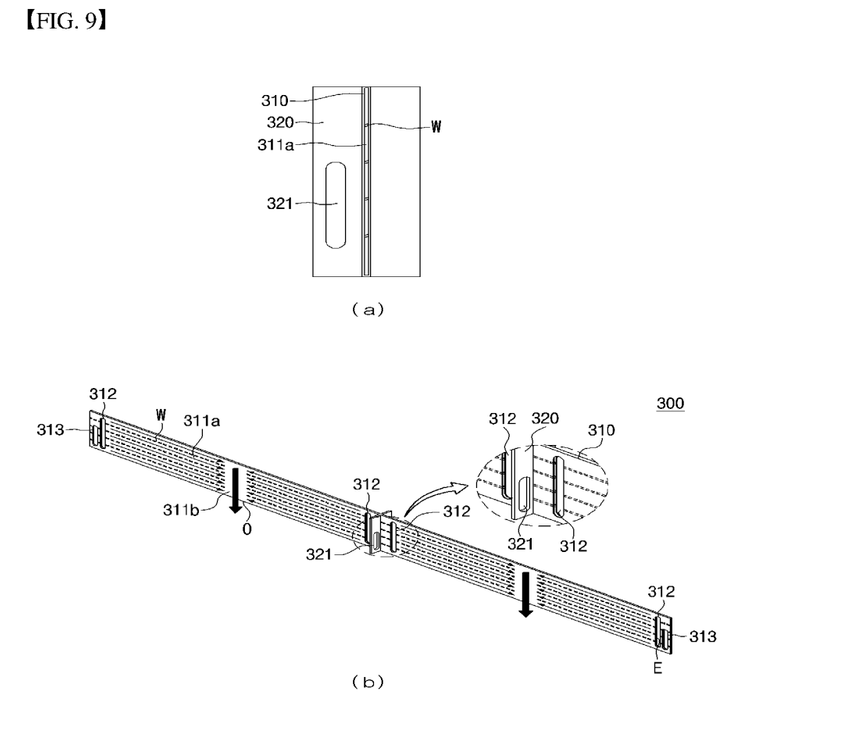
FIG. 9 is a set of a perspective view and a front view illustrating a structure of a venting plate included in the battery module of FIG. 7.

FIG. 7 is an exploded perspective view of a battery module 1000' according to another embodiment of the present invention, FIG. 8 is a plan view illustrating a coupling relationship of a battery cell assembly 100 that is a component of the battery module of FIG. 7, and FIG. 9 is a set of a perspective view and a front view illustrating a structure of a venting plate 300 included in the battery module 1000' of FIG. 7.

The present embodiment is different from the first embodiment in that the terminal bus bar is not located at the end portion of the battery cell assembly 100 in the longitudinal direction but is coupled to the electrode leads 11 and 12 of the battery cells of the longitudinal unit cell 110, which face each other in the longitudinal direction.

In addition, unlike in the first embodiment, the structure of the battery cell assembly 100 is a 2P4S structure in which the longitudinal unit cells 110 are stacked in four columns. However, even in the second embodiment, the battery cell assembly with a 1P4S structure as in the first embodiment can be applied in addition to the difference in which the position of the terminal bus bar is different. Likewise, the battery cell assembly having a 2P4S structure may be applied to the first embodiment. In addition, the battery cell assembly having various other structures extending in the longitudinal direction and the thickness direction of the battery cell can be applied as described above in the first and second embodiments.

The battery module 1000' of the present embodiment includes terminal bus bars 210 and 210' coupled to battery cells included in the battery cell assembly 100. In the present embodiment, the terminal bus bars 210 and 210' are coupled to the electrode leads 11 and 12 of the battery cells of the longitudinal unit cell 110, which face each other in the longitudinal direction, in the battery cell assembly.

In FIG. 8, for convenience of illustration, the venting plate 300 is not illustrated and only the electrical connection structure of the battery cell assembly 100 is illustrated.

Figure 10:
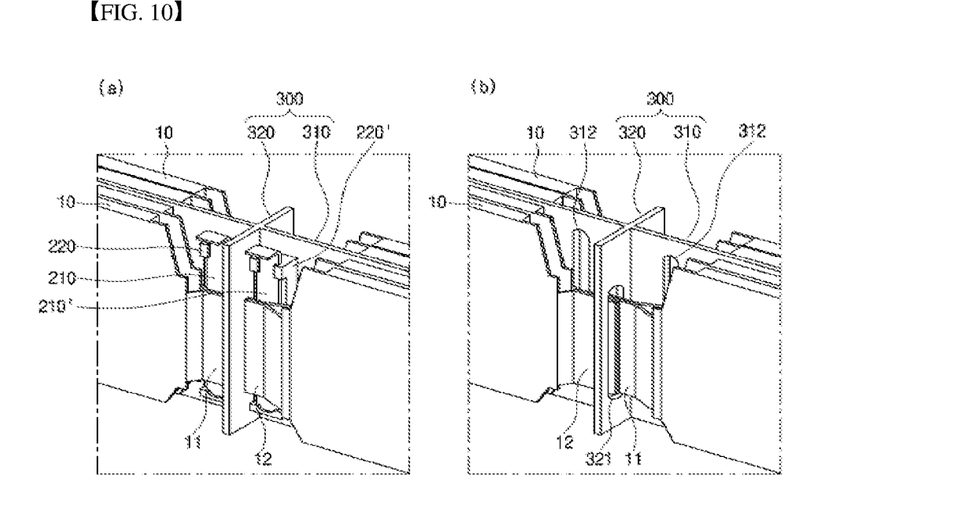
FIG. 10 is a perspective view illustrating a specific coupling relationship between the battery cells facing in a longitudinal direction of a longitudinal unit cell of the embodiment of FIG. 7.

In FIG. 8, in the longitudinal unit cells 110 of four columns, the electrode leads 11 and 12 of the battery cells, which face each other in the longitudinal direction, of upper two columns are not coupled to each other and are coupled to the terminal bus bars 210 and 210' of different polarities, respectively (see FIG. 10). However, the electrode leads 11 and 11 or 12 and 12 of the battery cells adjacent in the thickness direction of the battery cell of the upper two columns may be coupled to each other, and the coupled electrode leads may be coupled together to the terminal bus bars 210 and 210'. On the other hand, in the longitudinal unit cells 110 of lower two columns, which are not coupled to the terminal bus bars 210 and 210', the electrode leads 11 and 12 of the battery cells, which face each other in the longitudinal direction, are coupled to each other. Specifically, in the longitudinal unit cells 110 of the lower two columns, electrode leads 11 and 11 or 12 and 12 of battery cells adjacent to each other in the thickness direction of the battery cell may be coupled to each other, and then coupled to electrode leads 12 and 12 or 11 and 11 of the other battery cells of the lower two columns, which are opposite the battery cells in the longitudinal direction.

Meanwhile, the electrode leads 11 and 12 of the battery cells included in the longitudinal unit cells 110 of adjacent columns at the front end and rear end of the longitudinal unit cell 110 in the longitudinal direction are bent in the thickness direction of the battery cell and coupled to each other by welding.

In addition, the battery module 1000' of the present embodiment includes the venting plate 300 disposed between the columns of the longitudinal unit cells 110 and having a gas venting channel 311 therein.

Referring to FIG. 7, the same number of columns (two columns) of longitudinal unit cells 110 are arranged on each of both sides of the venting plate 300.

In section (b) of FIG. 9, one embodiment of the venting plate 300 is illustrated. The structure of the venting plate 300 of the present embodiment is almost the same as the structure of the venting plate 300 of the first embodiment. That is, the gas venting channel 311 composed of a longitudinal channel 311a and a transverse channel 311b is provided inside the venting plate 300.

In addition, a venting through-hole 312 communicating with the gas venting channel 311 (a longitudinal channel) is located at a position corresponding to a gas pocket portion of the battery cell, and a through hole 313 for electrode lead coupling is provided in a front portion thereof. In addition, in addition to a body portion 310 extending in the longitudinal direction of the battery cell, a structure in which a heat propagation prevention plate 320 is provided perpendicular to the body portion is the same as that of the first embodiment. In the first embodiment, the terminal bus bar is installed at the end portion of the longitudinal unit cell 110 and is not installed between the battery cells of the longitudinal unit cell 110 facing in the longitudinal direction. Accordingly, the lead coupling through-holes 321 to which the electrode leads of the battery cells, which face each other in the longitudinal direction, may be coupled are provided in both the left and right sides of the heat propagation prevention plate 320 (see section (a) of FIG. 4). However, in the present embodiment, the terminal bus bars 210 and 210' are installed at one side with respect to the venting plate 300, and the electrode leads 11 and 12 of the battery cells, which face each other in the longitudinal direction, are respectively coupled to the terminal bus bars 210 and 210', but the electrode leads 11 and 12 of the battery cells, which face each other in the longitudinal direction, are not coupled to each other. Accordingly, the lead coupling through-hole 321 is not provided on the one side of the heat propagation prevention plate 320 and is provided only on the other side thereof. The electrode leads 11 and 12, which face each other in the longitudinal direction, of the battery cells located on the other side of the venting plate 300 may be coupled to each other through the lead coupling through-hole 321.

As shown in FIG. 7, the present embodiment also includes a module case 400 in which the battery cell assembly 100 and the venting plate 300 are accommodated. The module case 400 of an embodiment of the present invention includes a front end plate 430' and a rear end plate 440'. The front end plate 430' and the rear end plate 440' are coupled to coupling bodies of a C-shaped wall 410 and an I-shaped wall 420 to close front and rear sides of the module, respectively. The terminal bus bar is not coupled to the front end plate 430' or the rear end plate 440' of the present embodiment.

The module case 400 includes a venting hole 411 at a position communicating with the gas venting channel 311 of the venting plate 300. For example, the venting hole 411 may be provided in an upper surface or a lower surface of the module case 400 at a position connected to an outlet O of a transverse channel 311b, which is a portion of the gas venting channel 311 in the venting plate 300 of section (b) of FIG. 9. The battery module 1000' of the present embodiment can also rapidly discharge gas and flame in the battery module through the venting hole 411 of the gas venting channel 311 and the module case 400, thereby further improving the safety of the expandable battery module.

Figure 11:
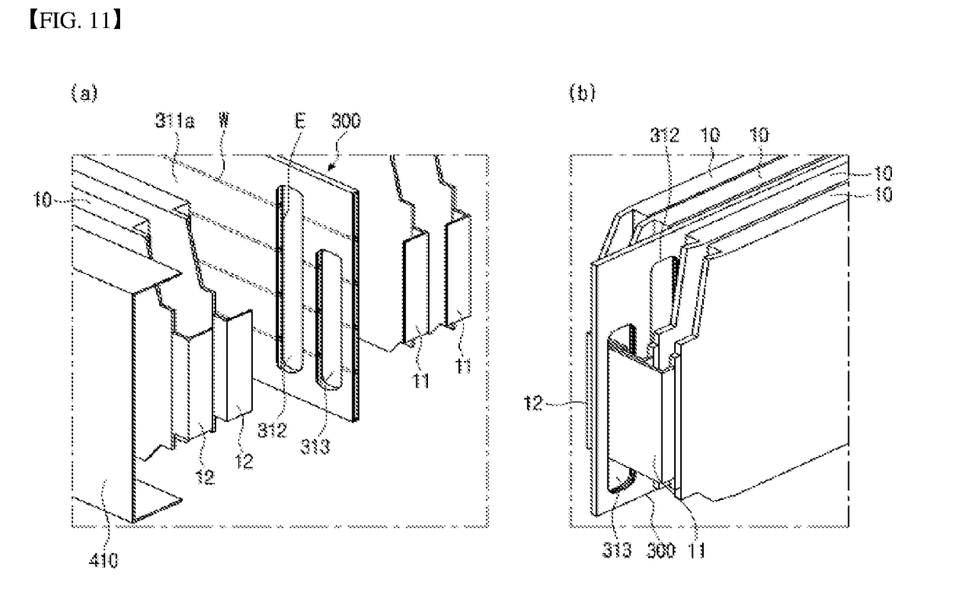
FIG. 11 is a perspective view illustrating a specific coupling relationship between the battery cells located at end portions of the longitudinal unit cells of the embodiment of FIG. 7.

FIG. 10 is a perspective view illustrating a specific coupling relationship between the battery cells facing in the longitudinal direction of the longitudinal unit cell 110 of the embodiment of FIG. 7, and FIG. 11 is a perspective view illustrating a specific coupling relationship between the battery cells located at end portions of the longitudinal unit cells 110 of the embodiment of FIG. 7.

Specifically, sections (a) and (b) of FIG. 10 and sections (a) & (b) of FIG. 11 are perspective views specifically illustrating an electrical connection structure of the battery cell assembly 100 related to the venting plate 300 in a state in which the module case 400 is not assembled.

Section (a) of FIG. 10 illustrates coupling between the electrode leads of the battery cells 10, which face each other in the longitudinal direction and correspond to an intermediate portion of the longitudinal unit cell 110. The terminal bus bars 210 and 210' are respectively coupled to left and right portions of the body portion 310 of the venting plate 300 located, which are respectively located on left and right sides of the heat propagation prevention plate 320, at one side (front side) of the venting plate 300, and the electrode leads 11 and 12 of the battery cells in front two columns are respectively coupled to the terminal bus bars 210 and 210'. Terminal bus bar support blocks 220 and 220' may be installed on the venting plate and the terminal bus bars may be fitted into and coupled to the support blocks 220 and 220', so that the terminal bus bars 210 and 210' are easily coupled to the venting plate 300 (see FIG. 10A).

However, in the battery cells of the front two columns, the electrode leads 11 and 12 of the battery cells, which face each other in the longitudinal direction, are not coupled to each other.

Section (b) of FIG. 10 illustrates the other side (rear side) of the venting plate 300, and well illustrates that the electrode leads 11 and 12 of both battery cells, which face each other in the longitudinal direction, are coupled by welding through the lead coupling through-hole 321 provided in the heat propagation prevention plate 320 of the venting plate 300.

Sections (a) and (b) of FIG. 11 illustrates a coupling relationship of the electrode leads of the battery cells located at the end portions of the longitudinal unit cells 110, section (a) of FIG. 11 illustrates a state before coupling, and section (b) of FIG. 11 illustrates a state after the coupling.

In FIG. 11A, the electrode leads 12 and 12 of the longitudinal unit cells 110 of two columns at one side (front side) of the venting plate 300 are bent toward the venting plate 300 in the thickness direction of the battery cell, and the electrode leads 11 and 11 of the battery cells of the longitudinal unit cells 110 of two columns at the other side (rear side) are also bent toward the venting plate 300.

In FIG. 11B, the bent electrode leads 11 and 12 of the battery cells are coupled to each other by welding through the lead coupling through-hole 313 provided in the venting plate 300.

Figure 12:
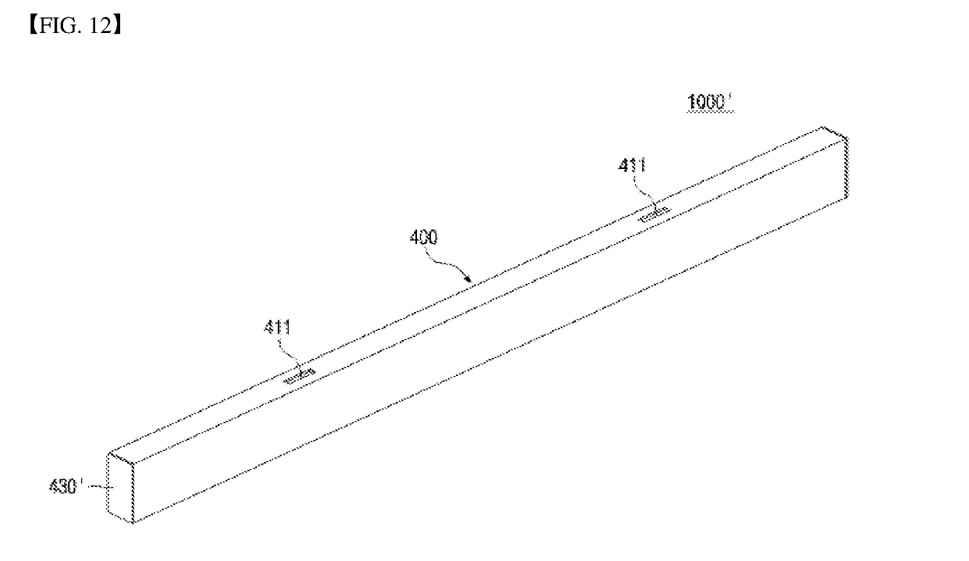
FIG. 12 is a perspective view illustrating an assembled exterior of the battery module of FIG. 7.

FIG. 12 is a perspective view illustrating an assembled exterior of the battery module of FIG. 7. A state is illustrated in which the battery cell assembly 100 and the venting plate 300 are accommodated in the module case 400 and assembled, and it is illustrated that simple end plates (the front end plate 430' and the rear end plate 440'), to which the terminal bus bar is not attached, are respectively coupled to a front end and a rear end of the module case 400. As shown in the drawing, the venting hole 411, which communicates with the gas venting channel of the venting plate 300 in the module, is located at a predetermined position in the upper surface of the module case 400.

Figure 13:
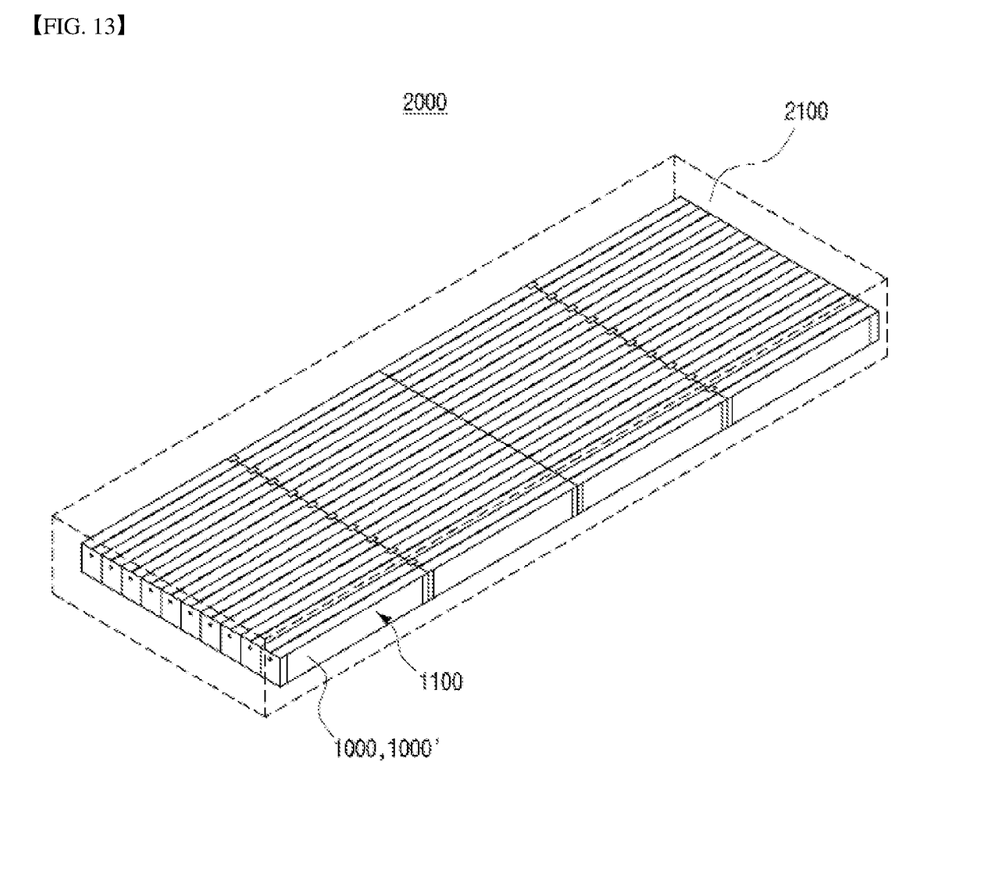
FIG. 13 is a schematic view of a battery pack including a battery module stack composed of the battery module of an embodiment the present invention.

FIG. 13 is a schematic view of a battery pack 2000 including a battery module stack 1100 composed of the battery module 1000 or 1000' of an embodiment of the present invention.

As described above, the battery module 1000 or 1000' of an embodiment of the present invention includes the battery cell assembly 100 in which the battery cell 10 is used as the longitudinal unit cell 110 and stacked in the thickness direction of the battery cell by a predetermined number, and the module case 400 extending long in the longitudinal direction to correspond thereto. Accordingly, a form in which the battery module 1000 or 1000' is easily connected in the longitudinal direction or the thickness direction, such as a Lego® block, is obtained. As shown in FIG. 13, a plurality of expandable battery modules 1000 or 1000' may be stacked in the longitudinal direction and/or the thickness direction of the battery cell 10 in one battery pack case 2100 to configure the battery module stack 1100. The stacking direction (shape) of the expandable battery modules 1000 or 1000' may be changed so as to correspond to the shape of the battery pack case 2100 to be applied in addition to that shown in FIG. 13. In this respect, it can say that the expandable battery module 1000 or 1000' of embodiments of the present invention has an extremely high degree of freedom in design. In particular, as described above, the battery module 1000 or 1000' of an embodiment of the present invention includes a predetermined venting hole 411 in the upper surface or a lower surface of the module case 400. Accordingly, when a venting path communicating with the venting paths is provided in the battery pack case 2100, gas inside the battery pack 2000 can also be easily removed.

The drawings disclosed herein are considered to be descriptive and not restrictive of the technical spirit of the present invention, and the scope of the technical spirit of the present invention is not limited by these drawings. The scope of the present invention should be construed by the appended claims along with the full range of equivalents to which such claims are entitled.

Meanwhile, in the present specification, terms indicating directions such as "up," "down," "left,", "right," "front," and "rear" are used, but these terms are only for convenience of description, and it will be obvious to those skilled in the art that these terms may vary depending on positions of an object, positions of an observer, or the like.

The invention claimed is:

1. A battery module comprising:
a battery cell assembly including two or more longitudinal unit cells, each of the two or more longitudinal unit cells includes two or more battery cells arranged in a row in a longitudinal direction, and each of the two or more longitudinal unit cells are stacked in two or more columns in a thickness direction of the battery cell;
a terminal bus bar coupled to the battery cells included in the battery cell assembly;
a venting plate having a body portion with a gas venting channel therein, wherein the venting plate is disposed between the columns of the longitudinal unit cells, wherein the gas venting channel is inside the body portion; and
a module case accommodating the battery cell assembly and the venting plate,
wherein a plurality of electrode leads of the battery cells are directly connected to each other,
wherein a second plurality of electrode leads are coupled to the terminal busbar, and
wherein a venting hole communicating with the gas venting channel is provided in the module case.

2. The battery module of claim 1,
wherein each of the two or more battery cells includes a pair of electrode leads at both ends in the longitudinal direction, and
wherein the terminal bus bar is coupled to the second plurality of electrode leads disposed at a front end or a rear end of the battery cell assembly in the longitudinal direction.

3. The battery module of claim 2, wherein
the plurality of electrode leads of the battery cells of the longitudinal unit cell facing each other in the longitudinal direction are welded and connected, and
wherein electrode leads of the battery cells of adjacent ones of a plurality of columns are bent in the thickness direction and coupled to each other by welding and are disposed opposite to the terminal busbar at the front end or the rear end of the battery cell assembly in the longitudinal direction.

4. The battery module of claim 2, wherein
the module case includes a front end plate and a rear end plate covering the front end and the rear end of the battery cell assembly, respectively, and
wherein the terminal bus bar is coupled to the front end plate or the rear end plate.

5. The battery module of claim 2, wherein
a number of the plurality of columns of the plurality of longitudinal unit cells disposed on each of both sides of the venting plate is the same, and
the venting plate extends in the longitudinal direction from a front end of the module case to a rear end of the module case.

6. The battery module of claim 5, wherein
the gas venting channel includes a longitudinal channel and a transverse channel, the longitudinal channel extending in a longitudinal direction of the venting plate and the transverse channel communicating with the longitudinal channel and extending orthogonal to the longitudinal direction of the venting plate, so as to communicate with an opening of the venting plate, and
the transverse channel is provided at a central location between the opposing ends of at least one of the battery cells included in the longitudinal unit cells.

7. The battery module of claim 6, wherein the venting plate includes a venting through-hole communicating with the longitudinal channel, wherein the venting through-hole is proximate to a gas pocket portion of at least one of the battery cells included in the longitudinal unit cells.

8. The battery module of claim 5, wherein the venting plate includes the body portion and a heat propagation prevention plate, the body portion extending in the longitudinal direction, and the heat propagation prevention plate extending orthogonal to the body portion between the electrode leads of the battery cells of the longitudinal unit cell facing each other in the longitudinal direction.

9. The battery module of claim 8, wherein a lead coupling through-hole is provided at each of a front end and a rear end of the body portion of the venting plate and at the heat propagation prevention plate, and the lead coupling through-hole allows the electrode leads of the battery cells to pass and be supported.

10. The battery module of claim 5, wherein
the electrode leads of the battery cells, which face each other in the longitudinal direction of the longitudinal unit cells of columns, and which are not coupled to the terminal bus bar, are welded and connected, and
wherein the electrode leads of the front end and the rear end of the battery cell assembly in the longitudinal direction are bent in the thickness direction and coupled to each other by welding.

11. The battery module of claim 1, wherein the terminal bus bar is coupled to the electrode leads of the battery cells of the longitudinal unit cell facing each other in the longitudinal direction.

12. The battery module of claim 11, wherein
a number of the plurality of columns of the plurality of longitudinal unit cells disposed on each of both sides of the venting plate is the same, and
the venting plate extends in the longitudinal direction from a front end of the module case to a rear end of the module case.

13. The battery module of claim 12, wherein
the gas venting channel includes a longitudinal channel and a transverse channel, the longitudinal channel extending in a longitudinal direction of the venting plate, and the transverse channel communicating with the longitudinal channel and extending orthogonal to the longitudinal direction of the venting plate, so as to communicate with an opening of the venting plate, and
the transverse channel is provided at a central location between the opposing ends of at least one the plurality of battery cells included in the longitudinal unit cell.

14. The battery module of claim 13, wherein the venting plate includes a venting through-hole communicating with the longitudinal channel, wherein the venting through-hole is proximate to a gas pocket portion of at least one of the plurality of battery cells included in the longitudinal unit cell.

15. The battery module of claim 12, wherein the venting plate includes a body portion and a heat propagation prevention plate, the body portion extending in the longitudinal direction, and the heat propagation prevention plate extending orthogonal to the body portion between the electrode leads of the battery cells of the longitudinal unit cells which face each other in the longitudinal direction.

16. The battery module of claim 15, wherein a lead coupling through-hole is provided at each of a front end and a rear end of the body portion of the venting plate and at the heat propagation prevention plate, and the lead coupling through-hole allows the electrode leads of the battery cells to pass and be supported.

17. The battery module of claim 1, wherein the plurality of electrode leads are directly coupled to each other without an inter busbar.

18. A battery pack comprising a battery module stack including a plurality of battery modules of claim 1 stacked in at least one of the longitudinal direction and the thickness direction.

* * * * *